United States Patent
Devarapalli et al.

(10) Patent No.: US 7,539,159 B2
(45) Date of Patent: May 26, 2009

(54) MAINTAINING REACHABILITY OF A MOBILE NODE

(75) Inventors: Vijay Devarapalli, Sunnyvale, CA (US); Basavaraj Patil, Coppel, TX (US); Kengathran Sivalingam, Irving, TX (US)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 11/056,390

(22) Filed: Feb. 14, 2005

(65) Prior Publication Data

US 2005/0226180 A1    Oct. 13, 2005

(51) Int. Cl.
*H04Q 7/00* (2006.01)

(52) U.S. Cl. .................. 370/328; 370/409; 455/433; 709/245

(58) Field of Classification Search .......... 370/237, 370/238, 328, 401, 443, 395.54, 409; 455/411, 455/416, 445, 432.1, 433; 709/219, 225, 709/227, 236, 249, 245
See application file for complete search history.

(56) References Cited

U.S. PATENT DOCUMENTS

| | | | | |
|---|---|---|---|---|
| 6,665,718 | B1 * | 12/2003 | Chuah et al. | 709/225 |
| 6,707,809 | B1 * | 3/2004 | Warrier et al. | 370/351 |
| 2001/0012777 | A1 * | 8/2001 | Igarashi et al. | 455/435 |
| 2003/0095523 | A1 * | 5/2003 | Korus et al. | 370/338 |
| 2003/0161287 | A1 * | 8/2003 | Venkitaraman et al. | 370/338 |
| 2004/0228335 | A1 * | 11/2004 | Park et al. | 370/352 |
| 2006/0171370 | A1 * | 8/2006 | Matsumoto et al. | 370/351 |
| 2007/0124592 | A1 * | 5/2007 | Oyama | 713/171 |

FOREIGN PATENT DOCUMENTS

WO    WO 01/19053 A1    3/2001

OTHER PUBLICATIONS

Chen et al., "*Dynamic Home Agent Reassignment in Mobile IP*", Wireless Communications and Networking Conference, 2002, XP-010585732, IEEE, vol. 1, Mar. 17, 2002, pp. 44-48.

Zheng et al., 1"*A Case for Mobility Support with Temporary Home Agents*", Computer Communications and Networks, 2001, IEEE, Oct. 15, 2001, XP-010562099, pp. 226-233.

Alpesh Patal et al., "Network Access - Identifier Option for Mobile IPv6", Mobile IP Working Group, Internet Draft, Feb. 2004, a total of 6 pages.

(Continued)

*Primary Examiner*—Nhan T Le
(74) *Attorney, Agent, or Firm*—Squire, Sanders & Dempsey L.L.P.

(57) ABSTRACT

A system for selectively updating an address of a mobile node capable of roaming in a home communication network and at least one visited network. The system including a database for storing at least one data entry which is a mapping between a humanly-readable identifier indicating the mobile node and a machine-readable identifier indicating a physical address at which the mobile node can be reached. A home agent in the home network has a connection to the database, and is operable to receive an update message from the mobile node when the mobile node roams into the visited network. Also there are units for determining whether the machine-readable identifier of the at least one entry in the database should be updated, wherein the database is updated if the update message additionally includes the humanly-readable identifier.

24 Claims, 11 Drawing Sheets

OTHER PUBLICATIONS

Mohamed M. Khalil et al., "Secure and Dynamic Allocation of Home Address for MIPv6", Internet Draft, Feb. 2004, a total of 6 pages.

P. Mockapetris, "Domain Names - Implementation and Specific," Network Working Group, Nov. 1987, a total of 52 pages.

S. Deering et al., "RFC2460 - Internet Protocol, Version 6 (IPv6) Specification", Network Working Group, Dec. 1998, a total of 29 pages.

3rd generation Partnership Project 2 "3GPP2", "Wireless IP Network Standard", 3GPP2 P.S0001-B, Oct. 25, 2002, a total of 105 pages.

* cited by examiner

FIG. 2

| FQDN | IP ADDRESS | | |
|---|---|---|---|
| computer24.domain.com | 3BC2:D4:35A4:1:2A:B:86C7:5F | | |
| computer25.domain.com | 7A42:D3::AC3B | | |
| ------------ | ------------ | | |

20, 20, 20, 14

MAINTAINING REACHABILITY OF A MOBILE NODE

FIELD OF THE INVENTION

The present invention relates to selectively updating the address of a mobile node and in particular, but not exclusively, wherein the mobile node is capable of roaming in a communications network.

BACKGROUND OF THE INVENTION

The Internet is a good example of a traditional IP (Internet Protocol) network. An IP network is a packet switched network wherein data packets are routed between nodes of a network from a sending node to a receiving node. IP networks operate on a per-hop basis, whereby packets are routed from one node to the next depending on various criteria, for example traffic, desired QoS (Quality of Service) etc. Traditionally, the Internet has been comprised of a network and/or a plurality of sub-networks of fixed computers connected by wired connections.

A so-called MIP (Mobile IP) network expands these principles to also take into account a situation when some of the nodes are no longer fixed and are able to move to different points in the IP network. Such nodes are referred to as MNs (Mobile Nodes). Furthermore, with the rapid development of wireless communication networks, it is possible to have wireless nodes which form part of the network.

A so-called DNS (Domain Name System) stores mappings of an IP address to a logical name, which can be easily remembered, for example a humanly-readable name usually called the FQDN (Fully Qualified Domain Name). That is the IP address is the physical address of a particular node in a network, and therefore the DNS can be thought of as comprising a mapping between a physical address of the host and a logical name given to that host which can be easily remembered. If a host wants to be reachable at a particular IP address, then an entry needs to be present in the DNS, which maps the FQDN to the IP address currently configured on the host. However, if the host is a MN, then the IP address changes whenever the MN moves and attaches to a different network.

One way of handling this is disclosed in the IETF (Internet Engineering Task Force) draft entitled "Mobility Support in IPv6" by D. Johnson et al, published in June 2003, which assumes that the HoA (home address) of the MN does not change and the MN can always be reached by its HoA, irrespective of where the MN currently is and what CoA (Care of address) it has configured. In this case, the MN's HoA is mapped with its FQDN in a DNS entry. However, the disadvantage of this is evident when employed in cdma2000 networks, wherein there is a requirement to support dynamic HoA configuration for a mobile node. In this situation, in order for the mobile node to be reachable at the newly configured HoA, the DNS entry which corresponds to the mobile node needs to be updated with the newly configured HoA.

Thus at least one aim of embodiments of the present invention is to have a mechanism for updating the DNS entry corresponding to a MN.

That is, if a MN configures a new HoA or configures a HoA for the first time, then the MN is not reachable at its newly configured HoA unless the DNS entry that corresponds to the MN is updated. Furthermore, the DNS update needs to be performed in a secure manner in order to prevent malicious modification to the DNS entries. For the MN to send a dynamic DNS update, it is preferred to have a security association with the DNS server. It is undesirable to have a security association between the DNS servers and every MN, since this is not scaleable. Also, a MN could potentially have multiple HoA's configured.

Therefore it is another aim of embodiments of the present invention for the MN to dynamically update the DNS entry in a secure and scaleable manner.

Furthermore, since a MN could potentially have multiple HoA's configured, the current standards do not make it possible for the MN to selectively indicate the HoA at which it wants to be reachable. Embodiments of the present invention provides a further advantage in that it allows the MN to selectively indicate which HoA it wants to be reachable at.

The IETF standards RFC 2136 of April 1997 and RFC 3007 of November 2003, both describe a DNS update message that can be sent by a node to a DNS server to update a DNS entry for a particular FQDN. However, neither of these documents deals with updating DNS entries for MNs. Also, these documents do not describe how security associations may be handled between the mobile nodes and the DNS system.

SUMMARY OF THE INVENTION

According to one aspect of the present invention there is provided a system for selectively updating an address of a mobile node capable of roaming in a home communication network and at least one visited network, the system comprising: a database for storing at least one data entry which is a mapping between a humanly-readable identifier indicating the mobile node and a machine-readable identifier indicating a physical address at which the mobile node is reachable; a home agent in the home network having a connection to the database, and being operable to receive an update message from the mobile node when said mobile node roams into a visited network; and means for determining whether the machine-readable identifier of the said at least one entry in the database should be updated, wherein the database is updated if the update message additionally comprises the humanly-readable identifier.

According to another aspect of the present invention there is provided a method for selectively updating an address of a mobile node capable of roaming in a home communication network and at least one visited network, the method comprising: mapping at least one entry in a database, between a humanly-readable identifier indicating the mobile node and a machine-readable identifier indicating a physical address at which the mobile node is reachable; forming a home agent in the home network having a connection to the database, receiving at the home agent an update message from the mobile node when said mobile node roams into a visited network; and updating the machine-readable identifier of the said at least one entry in the database if the update message additionally comprises the humanly-readable identifier.

According to yet another aspect of the present invention there is provided a home agent of a home communication network amongst which a mobile node is capable of roaming, the home agent comprising: interface circuitry for connecting to a database in the network having at least one data entry which is a mapping between a humanly-readable identifier indicating the mobile node and a machine-readable identifier indicating a physical address at which the mobile node is reachable; receiving circuitry operable to receive an update message from the mobile node when said mobile node roams into a visited network; and checking means operable to check the update message to determine if the update message comprises the humanly-readable identifier.

According to still yet a further aspect of the present invention there is provided a mobile node for selectively updating a database in a home communication network having a database having at least one entry for storing a mapping between a humanly-readable identifier indicating the mobile node and a machine-readable identifier indicating a physical address at which the mobile node is reachable; the mobile node comprising: interface circuitry for connecting to at least one of the home network and a visited network; output means for outputting an update message to a home agent when the interface circuitry connects to a visited network; means for determining if the machine-readable identifier of the at least one entry of the database should be updated; and if so means for inserting the humanly-readable identifier into the update message sent to the home agent using the output means.

According to yet another aspect of the present invention there is provided a system for selectively updating an address of a mobile node, the system comprising: a database for storing at least one data entry which is a mapping between a first identifier indicating the mobile node and a second identifier indicating a physical address at which the mobile node is reachable; a home agent in the home network having a connection to the database, and being operable to receive an update message from the mobile node in response to movement of said mobile node; and means for determining whether the first identifier of the said at least one entry in the database should be updated, wherein the database is updated if the update message additionally comprises the second identifier.

BRIEF DESCRIPTION OF DRAWINGS

For a better understanding of the present invention and to show how the same may be carried into effect, reference will now be made by way of example to the accompanying drawings in which:

FIG. 2 shows an example of mapping in a DNS according to an embodiment of the present invention;

DETAILED DESCRIPTION OF PREFERRED EMBODIMENTS OF THE PRESENT INVENTION

Figure 1:
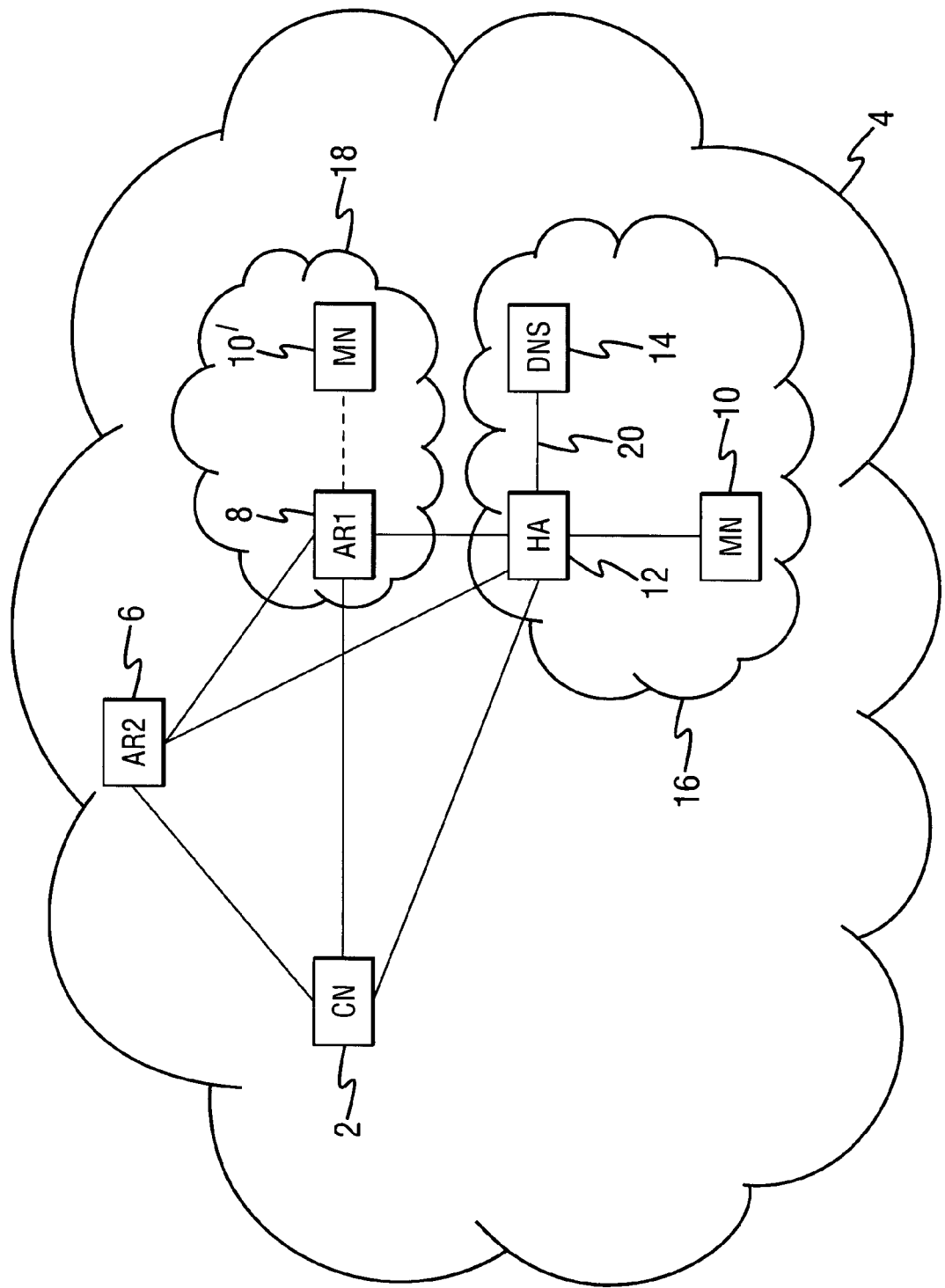
FIG. 1 shows an example of a communication network according to an embodiment of the present invention.

FIG. 1 is intended merely to show an example of the various networks which may support the present invention. In particular, cloud 4 indicates an all-encompassing network, for example including the Internet, which comprises a plurality of different elements. In particular a home network is indicated as a cloud 16 which is a sub-network of the network 4, and would typically comprise a so-called HA (Home Agent) node 12 and a DNS server 14. Furthermore, a MN 10 is shown connected in an initial position within the home network 16 and therefore is able to connect to the HA 12 directly.

The network 4 is also shown to comprise a second sub-network 18 having a so-called Access Router (AR) 8. Also, a second Access Router 6 is indicated in a different network. The MN 10' is indicated in a second position by a dotted line which connects to the AR 8, wherein the MN 10 has moved from a first position in the home network 16 to a different location in the second visited network 18 by connecting to the new node AR 8.

Furthermore a so-called CN (Correspondent Node) 2 is shown which could for example be any sending node in the network 4 or an intermediate router node for sending packets to a particular MN, as will be described in further detail later.

FIG. 2 shows an embodiment of the internal mapping of the DNS server 14, wherein a plurality of entries 20 are shown, each entry having a FQDN and an associated IPv6 address. Thus, the FQDN is a humanly-readable identifier for logically identifying the MN in the network by a name which can be remembered easily. However, in a MIP network, the MN will roam throughout the network and is able to connect to different ARs.

It is known that the HA (home agent) 12 has a binding cache which is able to maintain mapping between the so-called HoA (home address) and the so-called CoA (Care of Address) of the MN. Both of these addresses are IP addresses, i.e. machine-readable addresses, but the HoA is the address at which the MN can always be reached, and which is used in applications which are set up with the MN.

When the MN attaches to a new visited network, for example network 18 in FIG. 1, it gets a new CoA, and sends a BU (Binding Update) to its HA 12 to inform the HA 12 of its new CoA. The BU message sent to the HA contains both the CoA and the HoA of the MN. Therefore in known MIPv6 (Mobile IP version 6) networks, the MN always has a unique HoA, but has different CoA's when roaming amongst visited networks. In this way, all the packets addressed to the MN's HoA, for example from a sending node CN 2, will be routed to the HA, and redirected to the MN by the HA because the HA knows the current CoA of the MN.

The HA knows the current CoA from the BU messages whenever the MN attaches to a visited network and the HA maintains a binding cache mapping of the MN's current CoA to the HoA. Therefore in the example of FIG. 1, consider the situation when the MN is initially connected to the node AR1 8. At that instant, the binding cache in the HA has an entry reflecting the mapping of the current CoA and the HoA. Subsequently, the MN moves to the node AR2 6, at which time a BU message is sent to the HA 12 which contains the new CoA, and the binding cache in the HA is updated with said BU message.

In summary, for known MIPv6 systems, the HoA is fixed and does not change. The DNS server 14 stores a mapping between the logical name of the MN and its HoA, but since the HoA does not change, the DNS server does not need updating. However, in cdma2000 networks it is possible and even desirable that the HoA of the MN is dynamically assigned and therefore changes. In such a situation the DNS server will need to be updated.

Instead the embodiments of the present invention are able to take into account a dynamically changing HoA, and more particularly update the DNS server 14 to reflect these changes by selectively introducing a MO (Mobility Option) into the BU message sent to the HA, which indicates that the HoA should be updated in the DNS server.

It is proposed in embodiments of the present invention to include a DNS update MO (Mobility Option) to trigger the HA 12 to update the HoA of the MN in the DNS server. If the MN does not include the DNS Update MO with the BU message, sent to the HA, then the HA 12 only processes the binding cache, if required, and does not do anything else.

Figure 12:
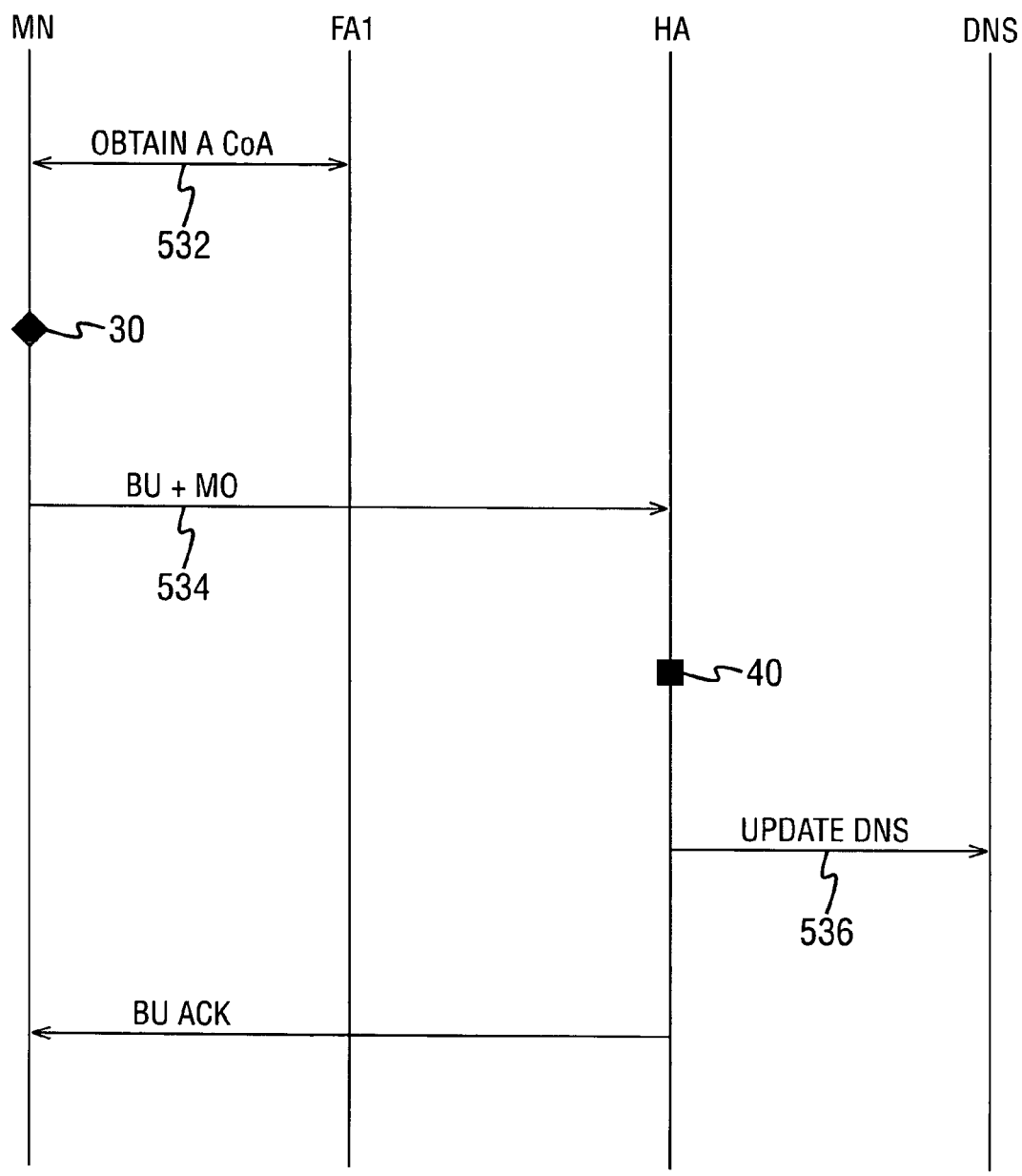
FIG. 12 shows message flows according to an embodiment of the present invention.

The sequence of events according to an embodiment of the present invention is now described in relation to FIG. 12 wherein the mobile node enters for example the visited network 18 by attaching to the node AR1 8. Whenever a MN attaches to a new visited network, then the MN obtains a CoA from the visited network as shown by step S32. That is, when the MN moves to a new network and obtains a CoA, which is a machine-readable IP address, the CoA is subsequently forwarded along with the HoA in a BU message to the HA 12. These processes are well known and therefore will not be described further herein. However, the system detailed in the following provides a number of enhancements.

Firstly, FIG. 12 shows that after obtaining the CoA, then a decision is taken by the MN (indicated by the diamond-shape 30) for selecting whether the entry in the DNS server needs updating. That is, the MN will decide if it wants the HoA (home address) at which the MN will be reachable to be updated in the DNS server. If the MN does decide that the current HoA (i.e. IP address) stored in the DNS server 14 needs updating, then the MN will introduce a so-called DNS update MO (Mobility Option) into the BU message to reflect this.

In summary, the MN always sends a BU to its HA whenever the CoA changes (i.e. whenever the MN connects to a new visited network), but additionally at certain times the MN may decide that the DNS entry needs to be updated to reflect a newly configured HoA. To achieve this, step S34 in FIG. 12 shows that a DNS update MO is introduced into the BU message, which is sent to the HA 12.

The HA 12 has a checking mechanism (indicated by the square block 40) which is responsible for checking the contents of the BU message and if it detects that the DNS update MO is present, this triggers a second message, i.e. DNS UPDATE, to be sent to the DNS server 40 as shown by step S36 for updating the entry of the DNS database containing the MN's HoA.

The MO includes a humanly-readable identifier, for example the FQDN "computer24.domain.com" as described in the particular DNS embodiment shown in FIG. 2. In an alternative embodiment the humanly-readable identifier takes the form of a so-called NAI (Network Access Identifier), which for example could be "user1@domain.com". Thus it can be seen that both the FQDN and the NAI are humanly-readable identifiers, wherein the FQDN resembles a standard URL (Universal Resource Locator) address and the NAI represents a standard email address. It should be appreciated that these are examples only and the humanly-readable identifier could take many other different forms.

Figure 3:
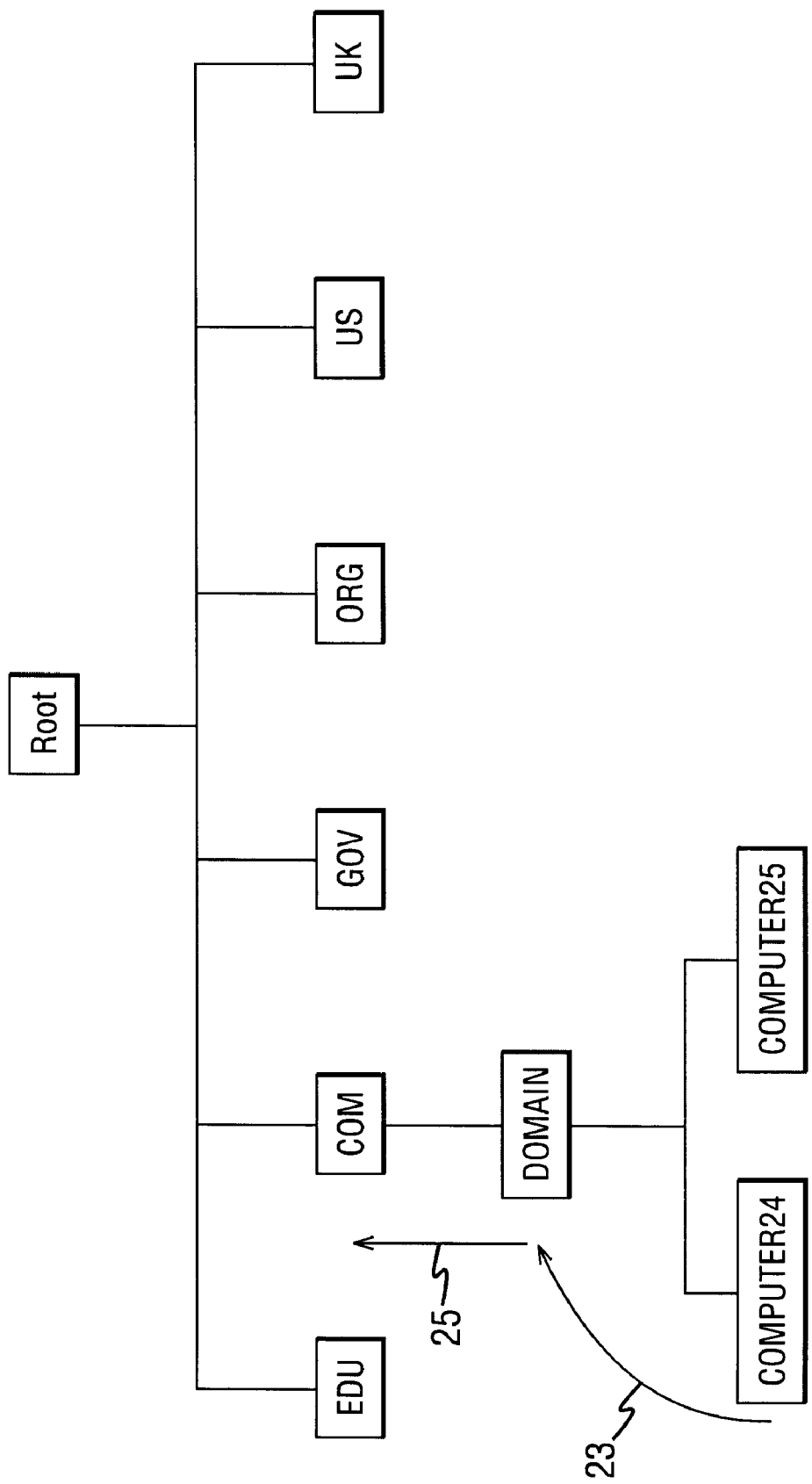
FIG. 3 shows an example of a partial hierarchy of a DNS system according to an embodiment of the present invention.

FIG. 3 shows in more detail how a DNS naming system operates in that a particular FQDN can be constructed using the hierarchical structure of FIG. 3. That is, the FQDN "computer24.domain.com" is shown to be formed from progressing through the different levels of the hierarchy indicated by the arrows 23 and 25.

In relation to FIG. 12, it is important to note that the BU+MO message sent at step S34 is protected by the existing so-called IPsec security association between the MN and the HA. Moreover, it is assumed that the HA 12 and the DNS server 40 are on the home link 20 which is a secured link for protecting the DNS update messages. In this manner, embodiments of the present invention are able to secure the DNS server against malicious attacks.

Furthermore, it should be appreciated that the MN can selectively indicate whether it wants the HoA to be configured in the DNS server and when it does not. In MIPv6 a MN could potentially have multiple HoA's configured, for example when there are multiple home prefixes on the home link. In such a case the embodiments of the present invention allow the MN to select which of the HoA's should be updated in the DNS server. One simple mechanism for the MN to select among multiple HoAs is to base such a decision on policy information which is configured on the MN. However, it should be appreciated that other selection mechanics are also possible.

Figure 4:
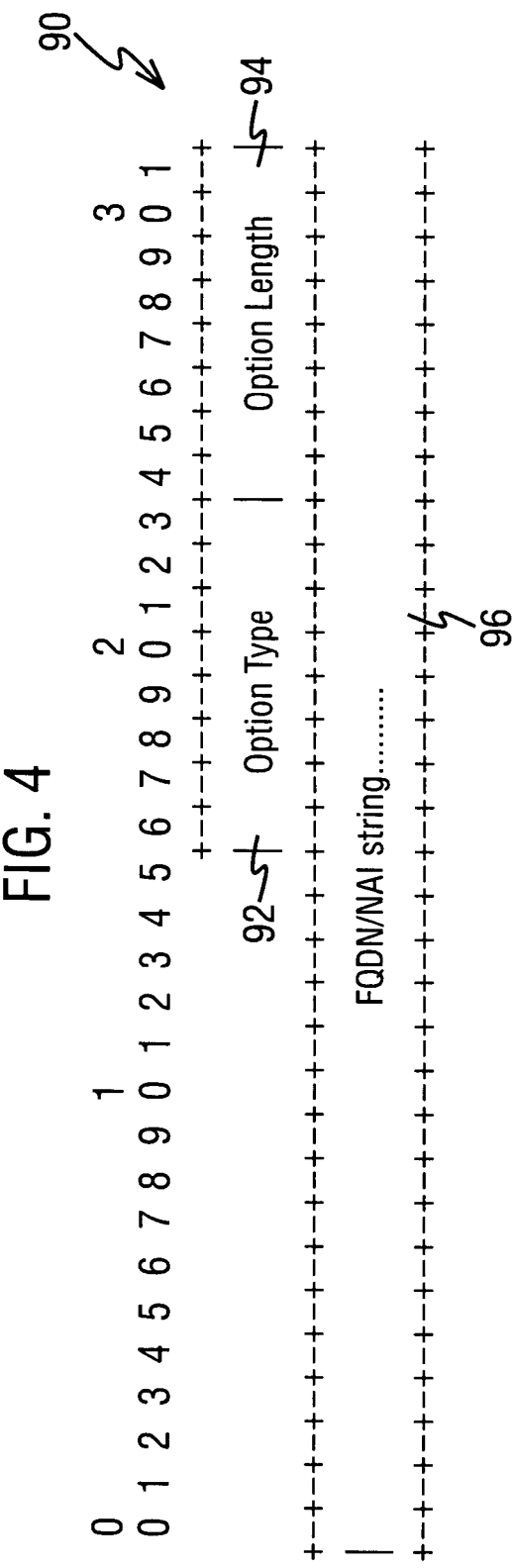
FIG. 4 shows an example of a mobility option which may be included in an update message signal that a DNS update is required according to embodiments of the present invention.

FIG. 4 shows an example of the structure of the MO 90 which is introduced into the BU when the MS decides that it wishes to update the DNS server. In particular, FIG. 4 shows that the MO comprises a so-called "Option Type" field 92 which comprises eight bits indicating the type of the MO. The so-called "Option Length" field 94 is an eight bit field indicating the length of the MO option in bytes. The "FQDN/NAI" field 96 is a variable length string containing the MN's FQDN or NAI depending on whichever embodiment is preferred.

Figure 5:
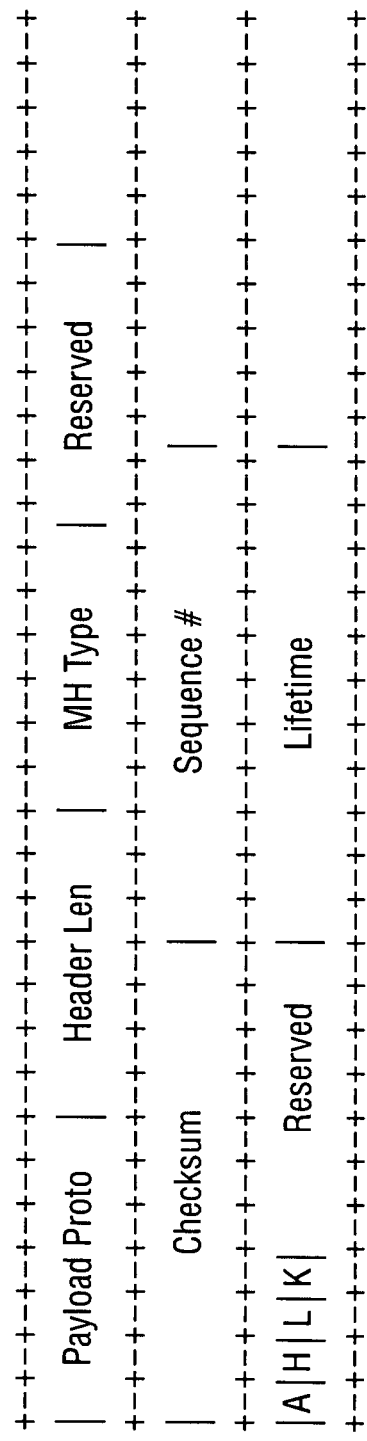
FIG. 5 shows the structure of a binding update.
Figure 6:
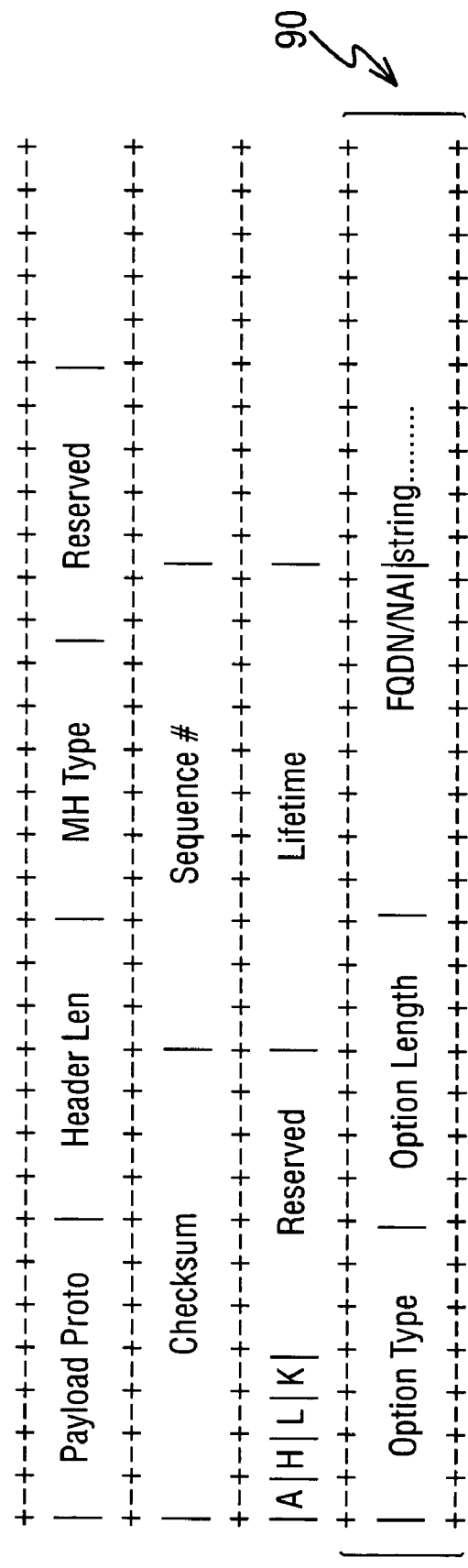
FIG. 6 shows the structure of a binding update with a DNS update mobility option according to an embodiment of the present invention.

FIG. 5 shows the structure of a BU which does not contain an MO. However, the structure of the BU with a DNS update MO 90 in accordance with an embodiment of the present invention is shown in FIG. 6.

Figure 7:
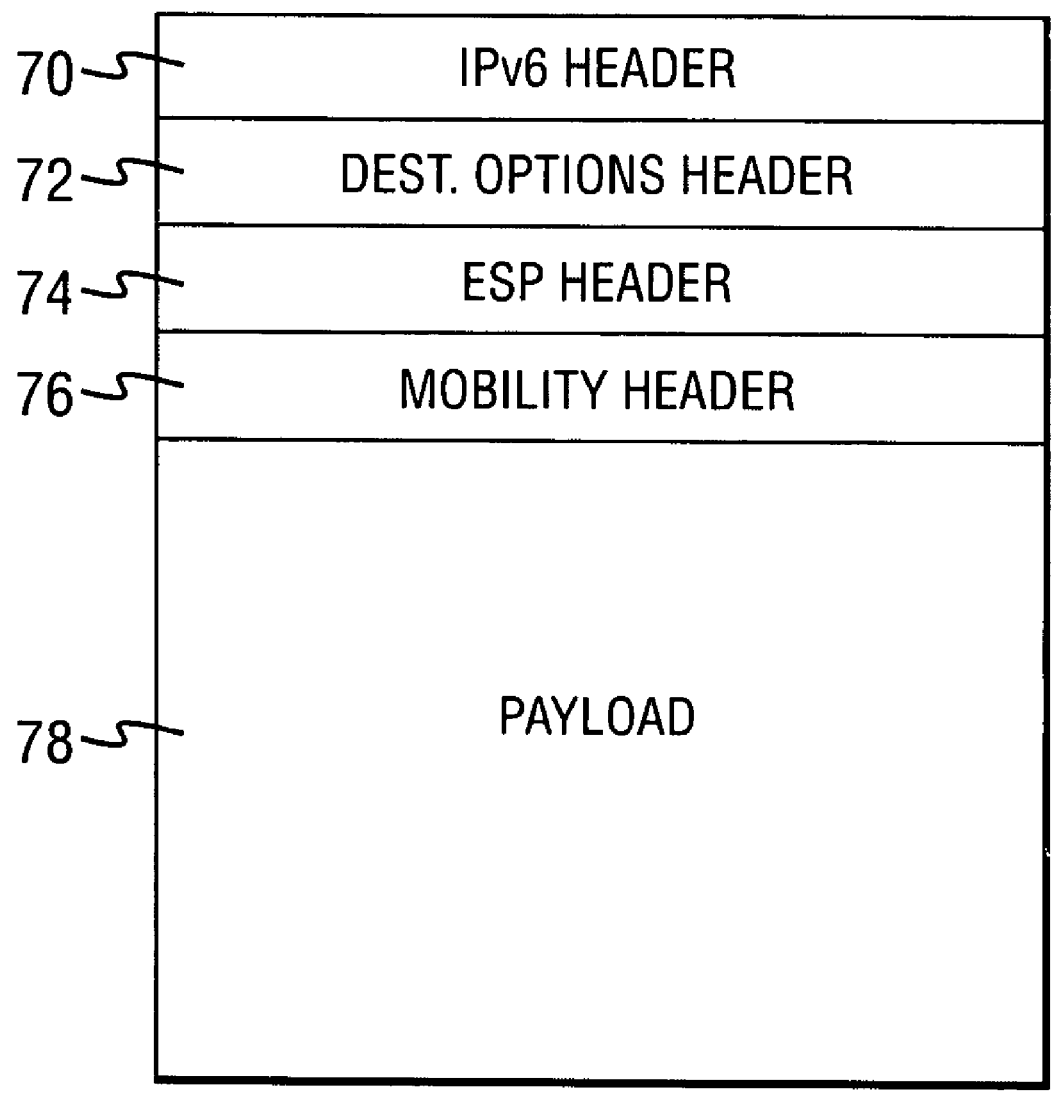
FIG. 7 shows the structure of an IP message according to an embodiment of the present invention.

FIG. 7 shows the format of the IP message that contains the BU according to an embodiment of the present invention. That is, the IP message is shown as comprising various header portions: an IPv6 header 70, a destination options header 72, an extension specific processor (ESP) header 74, a mobility header 76 and a payload or data portion 78.

Figure 8:
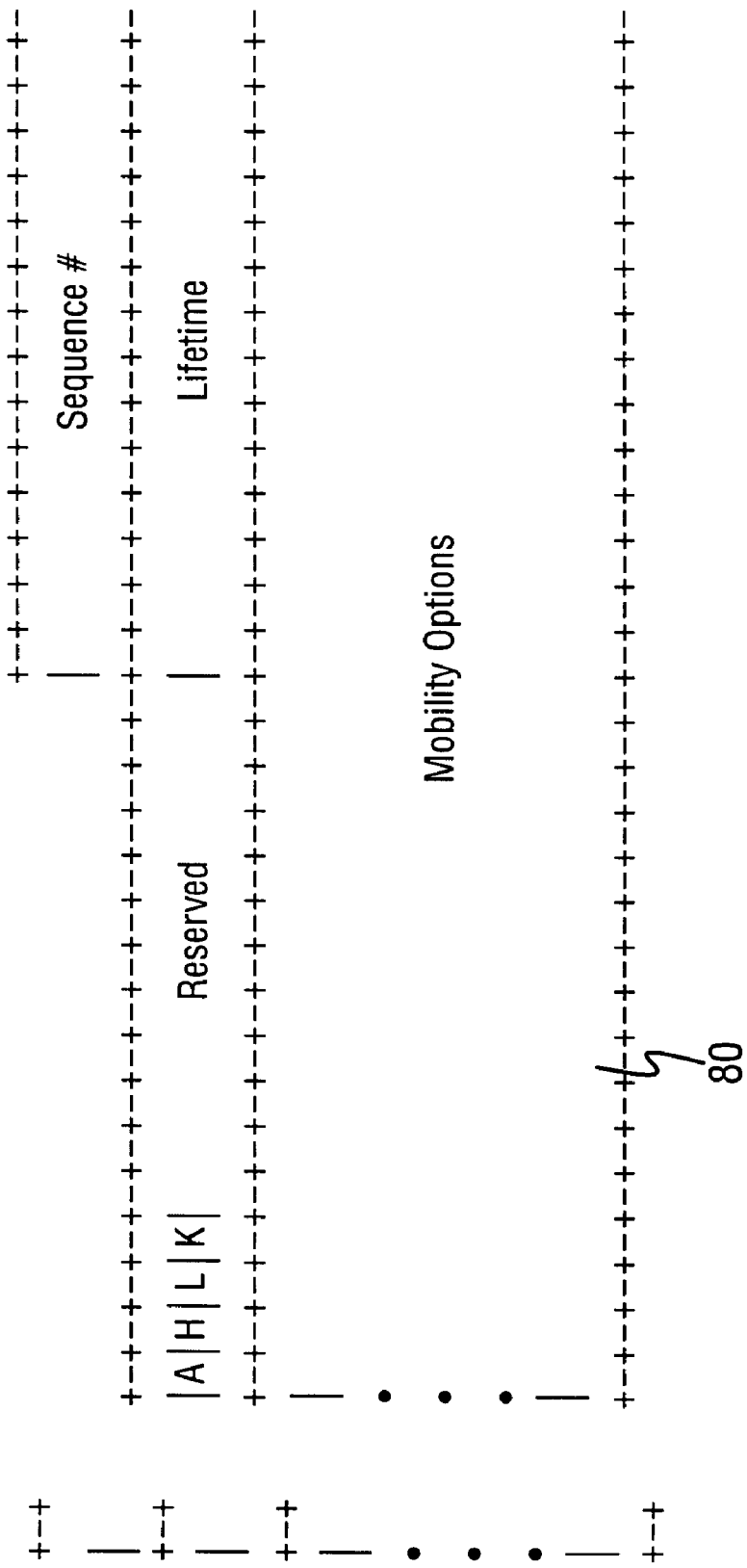
FIG. 8 shows a mobility header according to an embodiment of the present invention.

The mobility header portion of an IP message contains the BU and the MO (i.e. "Mobility Options") field 80 as shown in FIG. 8. The MO field 80 includes the DNS update MO 90 according to embodiments of the present invention.

Figure 9:
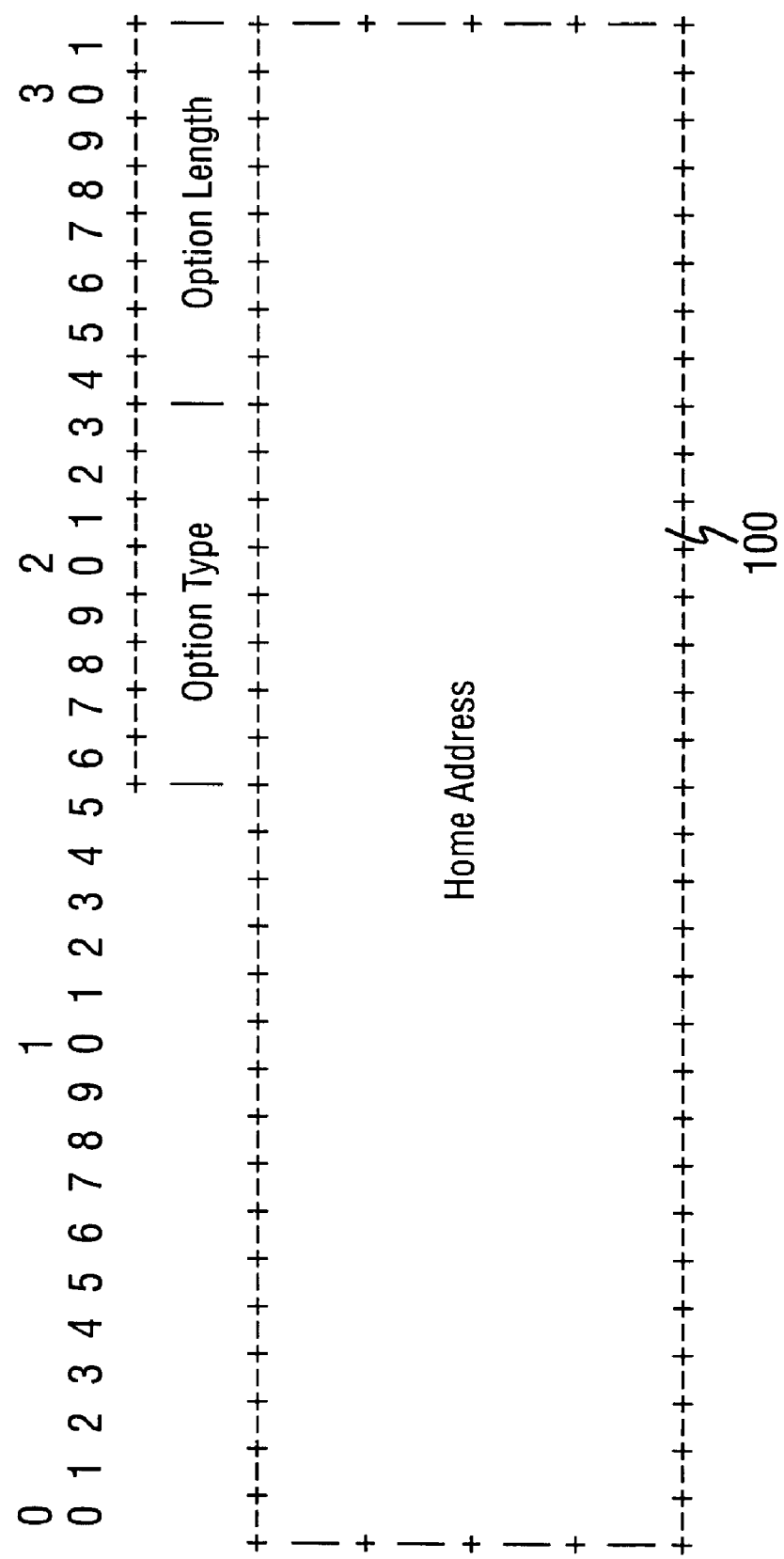
FIG. 9 shows a destinations option header according to an embodiment of the present invention.

The HoA is contained in the destinations option header 72, for example in the "Home Address" field 100 shown in FIG. 9.

Figure 10:
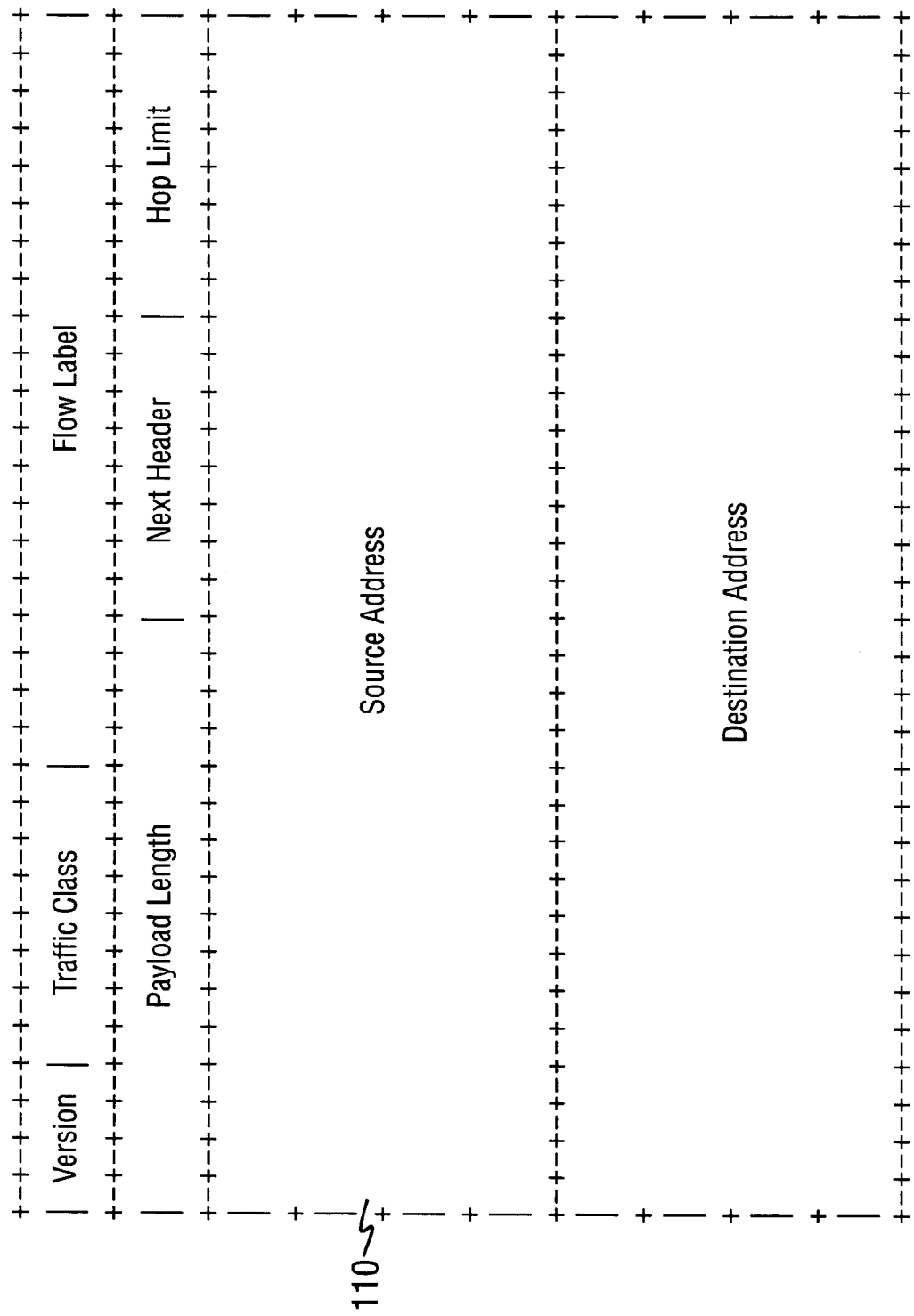
FIG. 10 shows an IPv6 header portion according to an embodiment of the present invention.

The CoA is contained in the IPv6 header portion 70, for example in the "Source Address" field 110 of FIG. 10.

Figure 11:
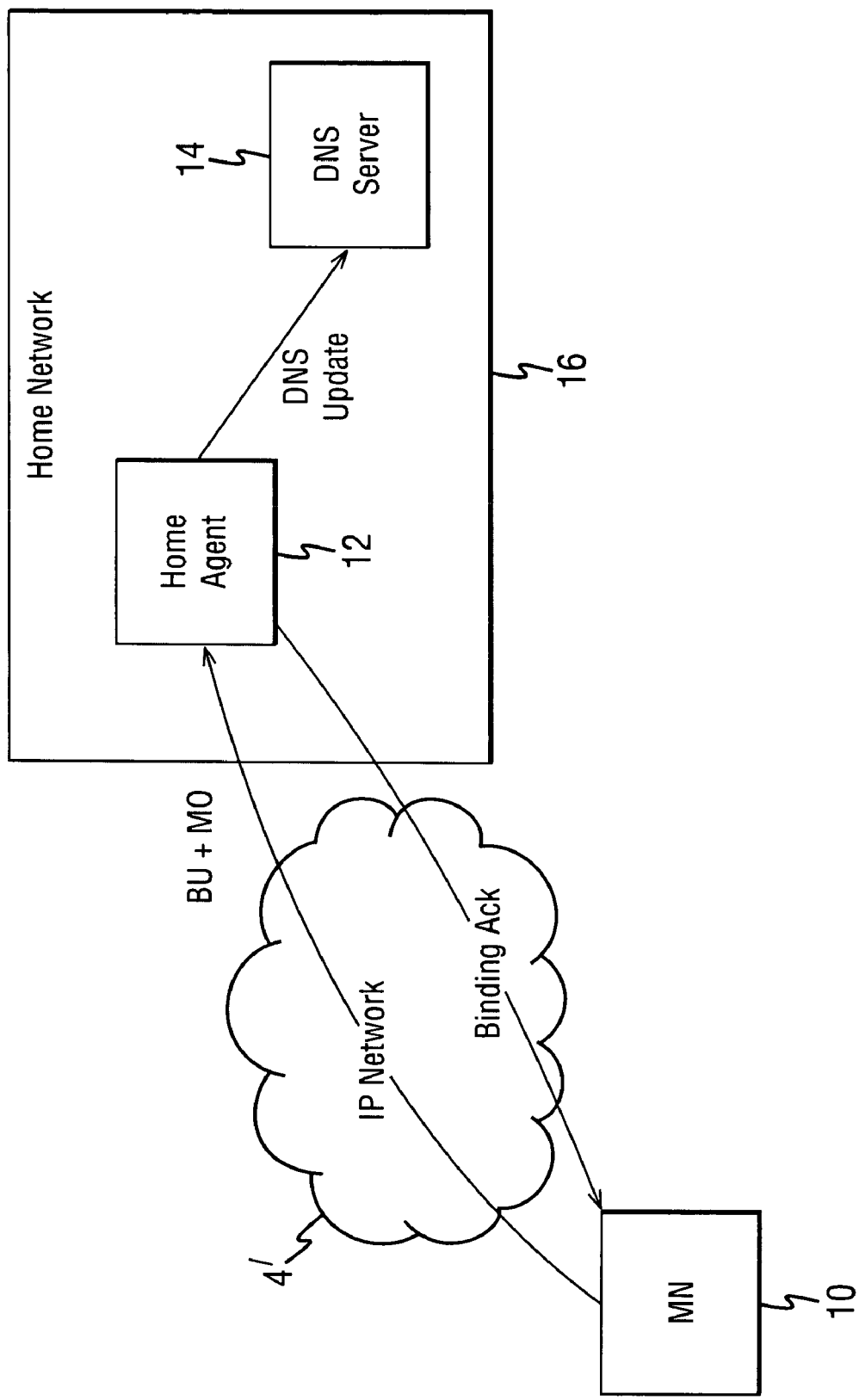
FIG. 11 shows how an update message is sent from the MN to a home agent, which triggers the sending of a DNS update message according to an embodiment of the present invention.

FIG. 11 shows how the DNS server 14 of the home network 16 is updated. In particular it can be seen that if the MN decides to update the DNS server with a newly configured HoA, it does this in two steps. Firstly, it sends a trigger message which is the BU+MO message to the home agent 12. The home agent 12 checks whether the received BU message comprises a humanly-readable identifier in the form of the DNS update MO shown in FIG. 4, and if it does, the home agent will send a DNS update message to the DNS server 40 for updating the server with the new HoA. That is, in one sense it can be understood that the BU+MO message acts as a signal sent by the MN to the HA for triggering the DNS update process which can be performed over the secure link between the HA and the DNS entry. In this way, the embodiments of the present invention are able to maintain reachability with the MN by its logical name (for example, "darkstar.nokia.com") irrespective of whether the CoA and HoA changes or where the MN is currently located.

It should be appreciated that the MN can be implemented with selection functionality for selecting whether the DNS update MO shown in FIG. 4 should in fact be introduced into the BU message. That is, the DNS update MO must be included with the BU message if the MN wishes a newly configured HoA to be updated in the DNS server. Also, the home agent has functionality for checking whether or not the DNS update MO is included in the received BU message, and if it is, then the BU+MO message is processed so that the DNS server is successfully updated with the newly configured HoA over the secure home link 20.

A mobile node is represented by a humanly-readable (logical) ID (i.e. FQDN/NAI), and is also assigned a machine-readable address (HoA) at which the MN wishes to be reached. A mapping between these addresses in maintained in a DNS server. However, if a MN wishes to be reached at a different HoA the DNS server needs to be updated accordingly. The mobile node is able to roam through one or more visited networks and attach to different corresponding AR's where it configures different IP addresses (machine-readable ID) in the cache binding mapping of the HA. A BU message is sent whenever the MN connects to an AR of a new visited network and therefore the HA knows the current CoA of the MN, which is configured in the current visited network.

In this manner, if a CN wishes to send packets to an MN, the CN first checks the MN's current HoA (i.e. the machine-readable IP address) with the DNS server, using the MN's FQDN/NAI (i.e. the logical address). In turn, the DNS server returns the HoA to the CN so that the CN sends packets to this HoA. Standard IP routing mechanisms will deliver packets destined for the MN's HoA to its home link. The HA in the home link performs IPv6 Proxy Neighbour Discovery and therefore can receive the packets that are sent for the MN's HoA. Then the HA checks the mapping in its binding cache and redirects the packets to the MN's CoA which is currently configured if the MN is in a visited network.

In embodiments of the present invention described herein, the BU message includes a humanly readable ID (FQDN/NAI) for indicating that the DNS is to be updated with a new HoA. Since the BU+MO message will contain the machine-readable ID as well as the humanly-readable ID, the DNS is updated by checking if there is an existing entry for the humanly-readable ID. If there is then it overwrites the existing machine-readable ID (HoA) with that of the HoA contained in the BU+MO message. Alternatively, if there is no existing entry a new entry is created in the DNS mapping the humanly-readable ID to the machine-readable ID (both contained in the BU+MO message).

In this way, the DNS can be selectively and continually updated with the HoA (i.e. machine-readable ID). If another node of the network, for example a CN, wants to communicate with the MN, it can send data packets addressed to the humanly-readable ID (FQDN/ANI) of the MN (for example: darkstar.nokia.com) and the DNS server will convert this to the MN's HoA (machine-readable ID) and packets are transferred, through the HA, to the current CoA of the MN as described above. That is, the BU message is sent to the HA whenever the MN connects to a new visited network in the network 4, and the BU message includes the HoA as a machine-readable ID (i.e. IP address). If the MN decides to update its HoA in the DNS database, it adds a Mobility Option (MO) in the BU message sent to the HA. The received BU+MO message triggers a DNS UPDATE message which is sent to the DNS server and which contains the new machine-readable identifier (IP address) which is regarded as MN's HoA.

A further advantage of embodiments of the present invention are that they make use of existing security associations which exist in the standards as defined in the MN and the HA for securing the BU+MO message and the overall DNS update process.

A further advantage of the present invention is that if the MN is configured with multiple HoA's, it can selectively indicate to the HA 12, the HoA at which it wants to be reachable. That is, the FQDN or NAI as specified in the MO shown in FIG. 4 will indicate to the HA which of the HoA's the MN has selected to be updated in the DNS server.

It should be appreciated that embodiments of the present invention are applicable to both MIPv6 and MIPv4 (version 4) technologies. In mobile IPv6, the MN can connect to a so-called access router rather than a foreign agent as is the case in a mobile IPv4 network.

The invention claimed is:

1. A system, comprising:
    a first database configured to store at least one data entry, the data entry comprising a mapping between a humanly-readable identifier indicating a mobile node configured to roam in a home communication network and at least one visited network and a machine-readable identifier indicating a physical home address at which the mobile node is reachable;
    a home agent in the home network having a connection to the first database, and a second database configured to store a mapping between a machine-readable identifier indicating a care of address and the home address, and being operable to receive a first update message from the mobile node when the mobile node roams into the at least one visited network; and
    a first processor configured to determine whether the home address of said at least one entry in the first database should be updated, wherein the first database is updated if the first update message comprises the humanly-readable identifier.

2. The system according to claim 1, wherein the first processor is further configured to check the update message to determine if the update message comprises the humanly-readable identifier.

3. The system according to claim 1, wherein the mobile node comprises:
    a second processor configured to introduce the humanly-readable identifier into the update message if the database is to be updated.

4. The system according to claim 1, wherein the mobile node is configured to select the physical address that is to be updated in a domain name service server and to send this physical address as a machine-readable identifier in the update message along with the humanly-readable identifier.

5. The system according to claim 1, wherein the database comprises the humanly-readable identifier, wherein the humanly-readable identifier is configured to indicate a logical name associated with the mobile node.

6. The system according to claim 1, wherein the database comprises the humanly-readable identifier, wherein the humanly-readable identifier is configured to indicate a fully qualified domain name.

7. The system according to claim 1, wherein the database comprises the humanly-readable identifier, wherein the humanly-readable identifier is configured to indicate an network access identifier.

8. The system of claim 1, wherein another node of the network sends data packets to the mobile node using another humanly-readable identifier, wherein the data packets are translated by the first database into the physical address at which the mobile node is reachable, and said data packets are forwarded accordingly.

9. The system of claim 1, wherein the first database comprises a domain name server.

10. The system of claim 1, wherein the database comprises the machine-readable identifier, wherein the machine-readable identifier comprises an internet protocol address.

11. The system of claim 1, wherein the network comprises a packet switched network.

12. The system of claim 1, wherein the network comprises a mobile internet protocol network.

13. The system of claim 1, wherein the home agent and the first database are connected by a secure internet protocol connection.

14. A method, comprising:
mapping at least one entry in a first database, between a humanly-readable identifier indicating mobile node configured to roam in a home communication network and at least one visited network and a machine-readable identifier indicating a physical home address at which the mobile node is reachable;
forming a home agent in the home network having a connection to the first database;
storing a mapping between a machine-readable identifier indicating a care of address and the home address in a second database in the home agent,
receiving at the home agent an update message from the mobile node when said mobile node roams into the at least one visited network; and
updating the home address of said at least one entry in the first database if the first update message additionally comprises the humanly-readable identifier.

15. The method of claim 14, wherein the updating the database further comprises:
checking that the first update message comprises the humanly-readable identifier; and
in response thereto, sending a second update message over the connection from the home agent to the database to update the first database.

16. The method of claim 15, wherein sending the second update message comprises sending the second update message over a secure connection.

17. An apparatus, comprising:
interface circuitry configured to connect to a first database in a home communication network amongst which a mobile node is capable of roaming, the database having at least one data entry which comprises a mapping between a humanly-readable identifier indicating the mobile node and a first machine-readable identifier indicating a physical home address at which the mobile node is reachable;
receiving circuitry configured to receive an update message from the mobile node when said mobile node roams into a visited network;
a processor configured to check the update message to determine if the update message comprises the humanly-readable identifier;
a second database configured to store a mapping between a machine-readable identifier indicating a care of address and the home address; and
sending circuitry configured to send a second message to the first database to update the home address if it is determined by the processor that the update message comprises the humanly-readable identifier.

18. The apparatus of claim 17, wherein the second database is further configured to store the separate mapping, wherein the care of address is sent to the apparatus in the first update message when the mobile node connects to the visited network.

19. An apparatus, comprising:
interface circuitry configured to connect to at least one of a home network and a visited network;
output means configured to output an update message to a home agent when the interface circuitry connects to a visited network;
determining circuitry configured to determine if a machine-readable identifier of at least one entry of a database should be updated, wherein database comprises the at least one entry for storing a mapping between a humanly-readable identifier indicating the apparatus and the machine-readable identifier indicating a physical home address at which the apparatus is reachable; and
inserting circuitry configured to insert the humanly-readable identifier into the update message sent to the home agent using the output means.

20. The apparatus of claim 19, wherein, when the apparatus roams into the visited network, the interface means obtain the machine-readable identifier from an access node of the visited network.

21. A computer program embodied on a computer readable medium, the computer readable medium storing code comprising computer executable instructions comprising:
mapping at least one entry in a first database, between a humanly-readable identifier indicating the mobile node and a machine-readable identifier indicating a physical address at which a mobile node, configured to roam in a home communication network and at least one visited network, is reachable;
forming a home agent in the home network having a connection to the first database;
storing a mapping between a machine-readable identifier indicating a care of address and the home address in a second database in the home agent,
receiving at the home agent an update message from the mobile node when said mobile node roams into the at least one visited network; and
updating the home address of said at least one entry in the first database if the first update message additionally comprises the humanly-readable identifier.

22. A system, comprising:
first storage means for storing at least one data entry, the data entry comprising a mapping between a humanly-readable identifier indicating a mobile node configured to roam in a home communication network and at least one visited network and a machine-readable identifier indicating a physical home address at which the mobile node is reachable;
home agent means in the home network for connecting to the first storage means and to second storage means for storing a mapping between a machine-readable identifier indicating a care of address and the home address, and being operable to receive a first update message from the mobile node when the mobile node roams into the at least one visited network; and processor means for determining whether the home address of said at least one entry in the first database should be updated, wherein the first database is updated if the first update message comprises the humanly-readable identifier.

23. An apparatus, comprising:

interface means for connecting to first storage means in a home communication network amongst which a mobile node is capable of roaming, the first storage means having at least one data entry which comprises a mapping between a humanly-readable identifier indicating the mobile node and a first machine-readable identifier indicating a physical home address at which the mobile node is reachable;

receiving means for receiving an update message from the mobile node when said mobile node roams into a visited network;

processing means for checking the update message for determining if the update message comprises the humanly-readable identifier;

second storage means for storing a mapping between a machine-readable identifier indicating a care of address and the home address; and sending circuitry configured to send a second message to the first storage means to update the home address if it is determined by the processing means that the update message comprises the humanly-readable identifier.

24. An apparatus, comprising:

interfacing means for connecting to at least one of a home network and a visited network;

outputting means for outputting an update message to a home agent when the interface circuitry connects to a visited network;

determining means for determining if a machine-readable identifier of at least one entry of storage means should be updated, wherein the storage means comprises the at least one entry for storing a mapping between a humanly-readable identifier indicating the apparatus and the machine-readable identifier indicating a physical home address at which the apparatus is reachable; and inserting means for inserting the humanly-readable identifier into the update message sent to the home agent using the output means when the determining means determines that the machine-readable identifier should be updated.

* * * * *